United States Patent
Youn et al.

(10) Patent No.: US 6,650,707 B2
(45) Date of Patent: Nov. 18, 2003

(54) TRANSCODING APPARATUS AND METHOD

(75) Inventors: Jeongnam Youn, San Jose, CA (US); Ming-Ting Sun, Mercer Island, WA (US); Chia-Wen Lin, Chiayi (TW); Wen-Hao Wang, Hsinchu (TW)

(73) Assignee: Industrial Technology Research Institute (TW)

( * ) Notice: Subject to any disclaimer, the term of this patent is extended or adjusted under 35 U.S.C. 154(b) by 225 days.

(21) Appl. No.: 09/796,600

(22) Filed: Mar. 2, 2001

(65) Prior Publication Data

US 2002/0163967 A1 Nov. 7, 2002

(51) Int. Cl.$^7$ ................................................ H04N 7/12

(52) U.S. Cl. .............................. 375/240.12; 375/240.25

(58) Field of Search ...................... 375/240.12, 240.25, 375/240.18; 348/401.1, 403.1, 394.1; H04N 7/12

(56) References Cited

U.S. PATENT DOCUMENTS

| | | | |
|---|---|---|---|
| 5,537,440 A | | 7/1996 | Eyuboglu et al. |
| 5,544,266 A | | 8/1996 | Koppelmans et al. |
| 5,600,646 A | | 2/1997 | Polomski |
| 5,657,015 A | | 8/1997 | Nakajima et al. |
| 5,729,293 A | | 3/1998 | Keesman |
| 6,339,614 B1 | * | 1/2002 | Gupta .................... 375/240.01 |
| 6,360,014 B1 | * | 3/2002 | Boon ......................... 382/233 |
| 2002/0076115 A1 | * | 6/2002 | Leeder et al. ................ 382/250 |
| 2002/0150157 A1 | * | 10/2002 | Lin et al. .................... 375/240 |

OTHER PUBLICATIONS

U.S. patent application No. 09/276,826, filed Mar. 26, 2002, titled Method and Apparatus for Motion Estimation for High Performance Transcoding.

A. Eleftheriadis and D. Anastassiou, "*Constrained And General Dynamic Rate Shaping Of Compressed Digital Video,*" ICIP '95, pp. 396–399, 1995.

H. Sun, W. Kwok, and J.W. Zdepski, "*Architectures for MPEG Compressed Bitstream Scaling,*" IEEE Trans. on Circuits and Systems for Video Technology, vol. 6, No. 2, pp. 191–199, Apr. 1996.

P.N. Tudor and O.H. Werner, "*Real–Time Transcoding of MPEG–2 Video Bit Streams,*" International Broadcasting Convention, Conference Publication No. 447, pp. 296–301, Sep. 12–16, 1997.

P. Assuncao and M. Ghanbari, "*Post–processing of MPEG2 Coded Video For Transmission At Lower Bit Rates,*" ICASSP '96, vol. 4, pp. 1998–2001, May 1996.

P. Assuncao and M. Ghanbari, "*Optimal Transcoding of Compressed Video,*" ICIP '97, pp. 739–742, 1997.

International Telecommunications Union, Draft ITU–T SG–15 Recommendation H.263, "*Video Coding for Low Bitrate Communication,*" May 1996.

(List continued on next page.)

Primary Examiner—Nhon Diep
(74) Attorney, Agent, or Firm—Finnegan, Henderson, Farabow, Garrett & Dunner, L.L.P.

(57) ABSTRACT

A transcoder for transcoding digital video signals includes a decoder and an encoder. In the decoder, an end-of-block (EOB) position of an incoming block received by the decoder is determined and a discrete cosine transform (DCT) block type is determined based on the determined EOB position. A reduced number of DCT coefficients is computed in a subsequent inverse DCT computation based on the DCT block type. In the encoder, if the incoming block is intercoded, no DCT coefficients are computed after the EOB of the incoming blocks is performing a DCT. Further, in the encoder when the incoming block is intercoded, an algorithm is applied to predict which DCT coefficients may become zero after a subsequent quantization operation, and only DCT coefficients that may not become zero are computed in performing the DCT.

14 Claims, 8 Drawing Sheets

OTHER PUBLICATIONS

International Telecommunications Union, ITU Telecommunications Standardization Sector LBC-95, ITU-T SG-15, "*Video Codec Test Model, TMN5*," Jan. 1995.

N. Bjork and C. Christopoulos, "Transcoder Architectures For Video Coding," IEEE Trans. on Consumer Electronics, vol. 44, No. 1, pp. 88–98, Feb. 1998.

G. Keesman et al., "*Transcoding of MGEG Bitstreams*," Signal Processing Image Comm., vol. 8, pp. 481–500, 1996.

"Information Technology—Generic Coding of Moving Pictures and Associated Audio Information: Video," International Standard ISO/IEC, 13818-2, May 15, 1996.

"Statistical Computation of Discrete Cosine Transform in Video Encoders," Journal of Visual Communications and Image Representation, vol. 9, No. 2, pp. 163–170, Jun. 1988.

Assuncao et al., "A Frequency-Domain Video Transcoder for Dynamic Bit-Rate Reduction of MPEG-2 Bit Steams," IEEE Trans. On Circuits and Syst. for Video Tech., vol. 8, No. 8, pp. 953–967, Dec. 1998.

D. G. Morrison, M. E. Nilsson, and M. Ghanbari, "Reduction of the Bit-Rate of Compressed Video While in its Coded Form," Sixth Int'l Workshop Packet Video, Portland, OR, Sep. 1994.

J. Moura, R. Jasinschi, H. Shiojiri-H. and J. C. Lin, "Scalable Video Coding Over Heterogeneous Networks," The International Society for Optical Engineering, SPIE vol. 2602, pp. 294–306, 1996.

J. Youn, M. T. Sun, and C. W. Lin, "Motion Estimation for High Performance Transcoding," IEEE Trans. on Consumer Electronics, vol. 44, No. 3, pp. 649–658, Aug. 1998.

N. Chadda, "A Software Only Scalable Video Delivery System for Multmedia Applications Over Heterogeneous Networks," In Proc. Int. Conf. on Image Processing, Washington, DC, Oct. 1995.

R. Mokry and D. Anastassiou, "Minimal Error Drift in Frequency Scalability for Motion Compensation DCT Coding," IEEE Trans. on Circuits and Syst. for Video Tech., vol. 4, No. 4, pp. 392–406, Aug. 1994.

R. J. Safranek, C. Kalmanek, and R. Carg, "Methods for Matching Compressed Video to ATM Networks," in Proc. Int. Conf. on Image, Washington, DC, Oct. 1995.

A. Vetro and H. Sun, "Generalized Motion Compensation for Drift Reduction," Proc. VCIP '98, SPIE vol. 3309, San Jose, CA, pp. 484–495, Jan. 1998.

IEEE Standards, "Standard Specifications for the Implementations of 8×8 Inverse Discrete Cosine Transform," IEEE Std. 1180–1190.

S. F. Chang and D. G. Messerschmitt, "Manipulation and Compositing of MC-DCT Compressed Video," IEEE Journal of Selected Areas in Communications, vol. 13, No. 1, pp. 1–11, Jan. 1995.

"Video Coding for Low Bit-Rate Communication," ITU-T Recommendation H-263, May 1996.

"Video Codec Test Model Near-Term, Version 8 (TMN8) Release 0," ITU Study Group 16, Portland, Jun. 1997.

I. M. Pao and M. T. Sun, "Modeling DCT Coefficients for Fast Video Encoding," IEEE Trans. on Circuits and Syst. for Video Tech., vol. 9, No. 4, pp. 608–616, Jun. 1999.

* cited by examiner

TRANSCODING APPARATUS AND METHOD

BACKGROUND OF THE INVENTION

1. Field of the Invention

The present invention relates in general to digital video signal processing and, more particularly, to improvements in video transcoding that reduce computation time.

2. Description of the Related Art

The present invention relates to the field of digital video signal processing. While definitions for selected terms in the field of digital video signal processing used herein are provided, a more complete set of definitions for this field of art is provided in International Standard ISO/IEC 13818-2 entitled "Information technology-Generic coding of moving pictures and associated audio information: Video," dated May 15, 1996, and ITU-T Rec. H.263 entitled "Video coding for low bit-rate communication," dated May 1997, which are incorporated in their entirety herein by reference. Also, the general requirements and operations of a video encoder are disclosed in Sun et al., "Statistical Computation of Discrete Cosine Transform in Video Encoders," Journal of Visual Communications and Image Representation, Vol. 9, No. 2, pp. 163–170, June, 1998, which is incorporated in its entirety herein by reference.

Transcoding as used herein refers to an operation of decoding into the pixel domain an incoming encoded compressed video signal, and then re-encoding the decoded video signal into an encoded signal having a desired bit rate or format. Such transcoding enables, for example, converting an incoming video signal at a given bit rate into another data stream having a different bit rate. A more specific example of an application of transcoding is to convert the bit rate of an MPEG compressed video signal at, e.g., 9 Mbit/sec, to a lower bit rate so the signal can be relayed at a cable head with a limited capacity and lower bit rate.

Figure 1:
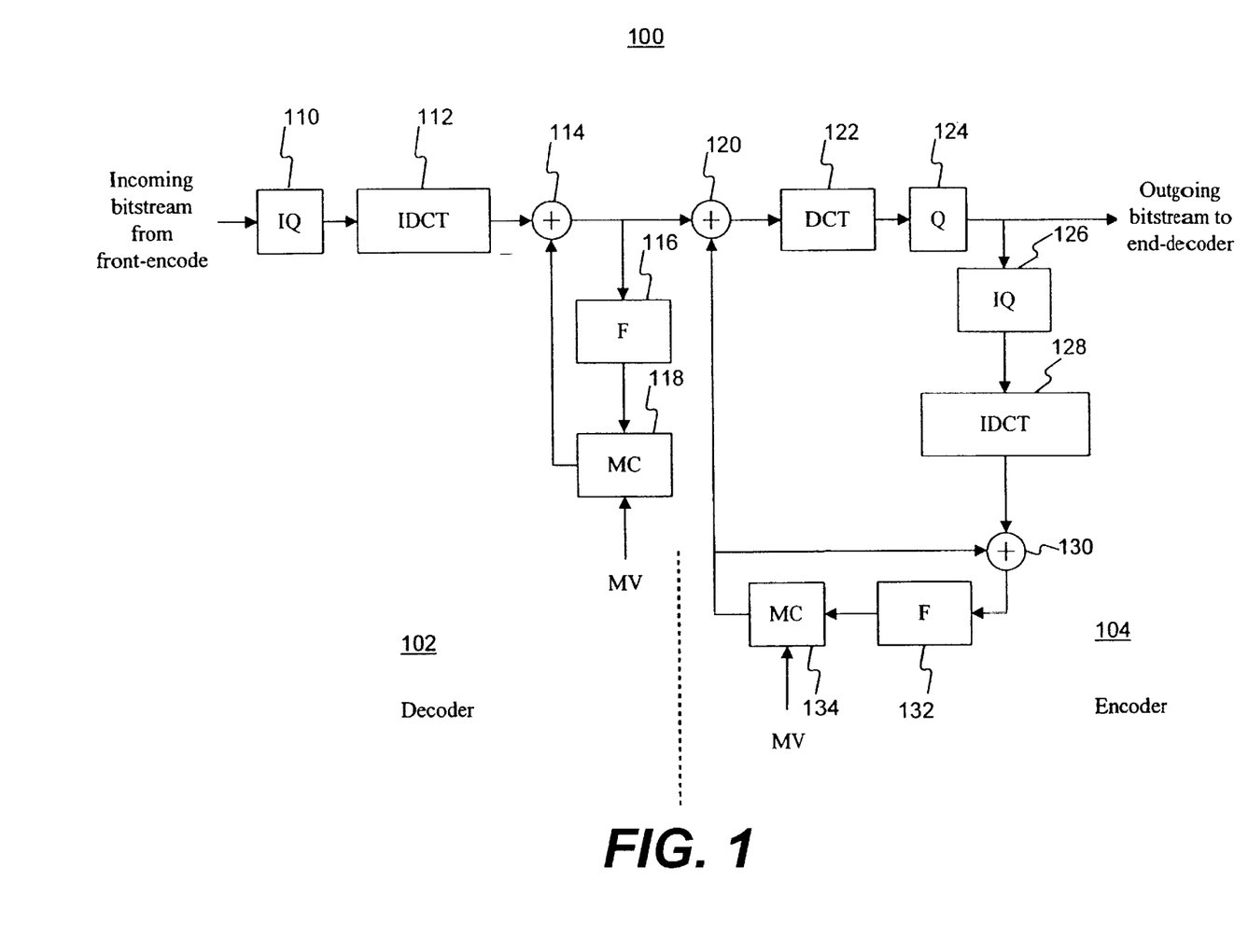
FIG. 1 illustrates a cascaded pixel domain transcoder architecture.

FIG. 1 illustrates a cascaded pixel domain transcoder architecture 100 that includes a decoder section 102 and an encoder section 104. Decoder section 102 includes a block 110 for performing an inverse quantization (IQ) on an incoming bit stream from a front-encoder (not shown) and a block 112 for performing an inverse discrete cosine transform (IDCT) on the output of block 110. Block 112 outputs the decoded bit stream which is applied to a first input of a summer 114. Motion compensation of the decoded bit stream is performed by a frame buffer (F) 116 and a motion compensation (MC) unit 118 coupled between a sum output and a second input of summer 114 and also coupled to receive motion vectors (MV).

Encoder section 104 includes a summer 120 having a first input coupled to receive the decoded and motion compensated bit stream from decoder section 102. A block 122 performs a discrete cosine transform (DCT) on a sum output of summer 120. The output of block 122 is applied to a block 124 which performs a quantization (Q) thereon. The output of block 124 is the encoded output of encoder section 104 and transcoder 100. The encoded output is ultimately intended for receipt by an end-decoder (not shown).

Motion compensation of the encoded output of encoder section 104 is performed by a block 126 for performing an IQ, a block 128 for performing an IDCT, a summer 130, a frame buffer (F) 132 and a motion compensation unit (MC) 134, all coupled between the output of block 124 and a second input of summer 120. Unit 134 is coupled to receive motion vectors (MV).

A direct implementation of transcoder 100 is to fully decode an incoming compressed bit-stream into the pixel-domain and then re-encode the decoded video into the desirable bit-rate. The cascaded pixel-domain transcoder architecture of transcoder 100 is flexible, since decoder 102 and encoder 104 can be totally independent of each other. For example, decoder 102 and encoder 104 can operate at different bit rates, picture resolutions, coding modes, and even according to different standards. The architecture can be implemented to achieve drift-free operation if the implementations of IDCT in the front-encoder and the end-decoder are known. In such a case, the decoder loop and the encoder loop can be implemented to produce exactly the same reconstructed pictures as those in the front-encoder and the end-decoder, respectively. Alternatively, if the implementations of the IDCTs in the front-encoder and end-decoder are not known, drift will not be significant, as long as the IDCT implementations satisfy IEEE Standard No. 1180-1990, which provides specifications for implementation of the IDCT, and macroblocks are refreshed as specified in other standards covering coding and communication of video signals, including the above-cited ISO/IEEE 13818-2 and ITU-T Rec. H.263. Since several coding parameters such as coding modes and motion vectors can be reused, the overall complexity of the architecture is not as high as the sum of a decoder and an encoder. However, the architecture is still computationally expensive.

To reduce the complexity of the cascaded pixel-domain transcoder architecture, several fast architectures have been proposed. For example, Eleftheriadis et al., "Constrained and general dynamic rate shaping of compressed digital video," Proc. IEEE Int. Conf. Image Processing, Washington, D.C., October 1995, discloses an open-loop transcoder in which bit-rate adaptation is achieved by requantizing or truncating the DCT coefficients. Since the transcoding is carried out in the coded domain, where complete decoding and re-encoding is not required, the open loop transcoder can achieve fast operation. However, open-loop transcoding can produce significant quality degradation caused by drift due to mismatched reconstructed pictures between the front-encoder and the end-decoder.

Figure 2:
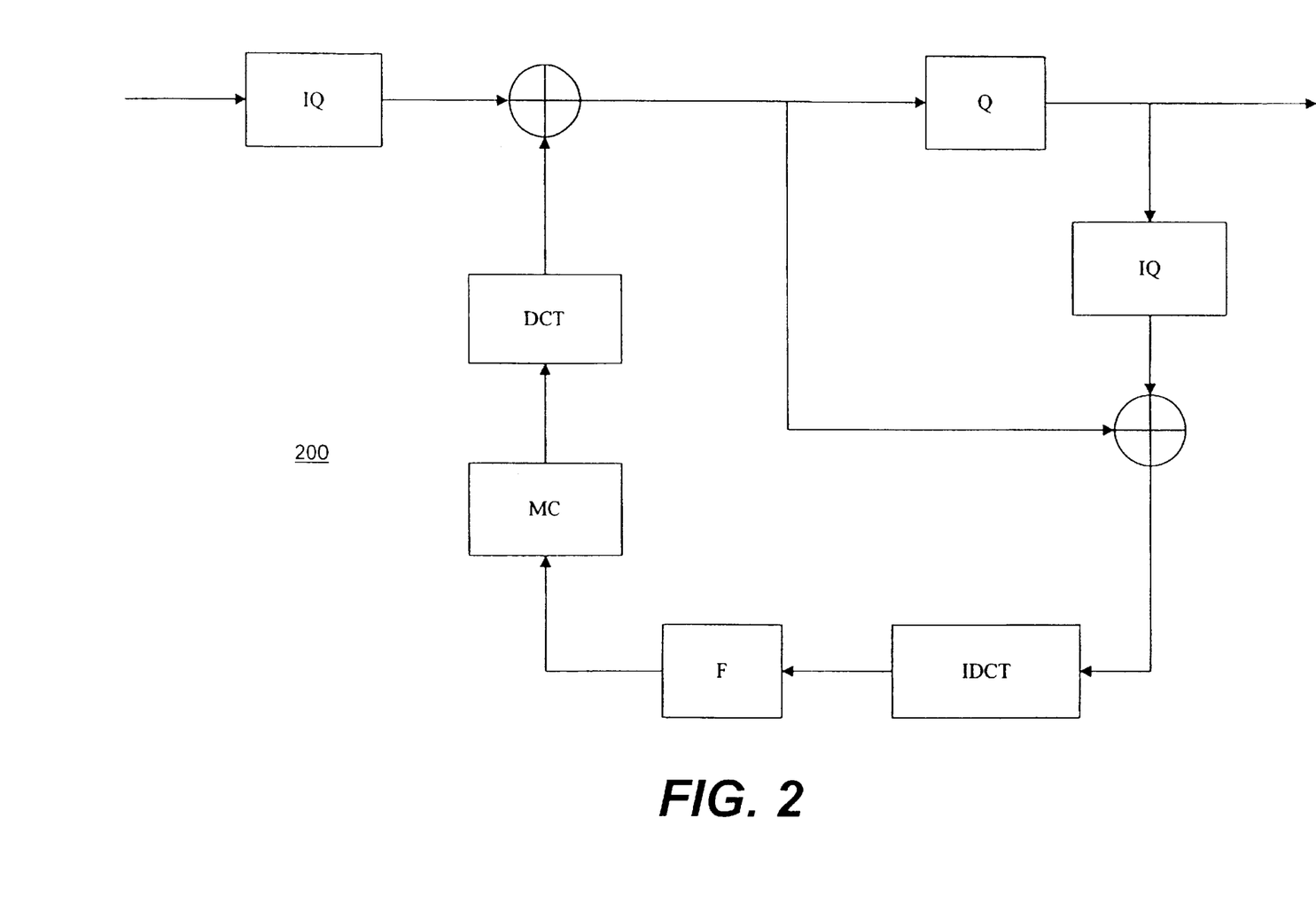
FIG. 2 illustrates a fast transcoder architecture.

To achieve less computation than the cascaded pixel-domain transcoder and better video quality than the open-loop transcoder, several other fast architectures have been proposed. Based on the assumptions that motion compensation (MC) and DCT/IDCT are linear operations, and a DCT will cancel out an IDCT (assuming the accuracy of DCT/IDCT operations is infinite), a fast transcoder architecture can be derived from the cascaded pixel-domain transcoder. FIG. 2 illustrates the architecture of one such fast transcoder 200 disclosed in Keesman et al., "Transcoding of MPEG bitstream," Signal Proc.: Image Commun., pp. 481–500, 1996. In FIG. 2, the functional acronyms within the blocks designate the same general functions as described above for FIG. 1. The architecture in FIG. 2 is based on the assumption that the same motion vectors and coding modes are present in the decoder and the encoder of the cascaded transcoder architecture so that they can be combined into one loop.

In FIG. 2, the DCT and IDCT are needed only for motion compensation performed in the pixel-domain. Therefore, if the motion compensation can be performed in the DCT domain, the architecture of a transcoder 300 illustrated in FIG. 3 can be implemented as discussed in Assunçao et al., "A frequency-domain video transcoder for dynamic bit-rate reduction of MPEG-2 bit streams," IEEE Trans. On Circuits Syst. Video Technol., Vol. 8, No. 8, pp. 953–967, 1998. This architecture is also disclosed in the above-cited Assunçao et al. reference and is referred to herein as the DCT domain transcoder. Thus, the DCT domain transcoder is configured by making substantial changes to cascaded pixel-domain transcoder architecture.

It would, however, be desirable to reduce the computational complexity of the cascaded pixel-domain transcoder architecture by means of less substantial changes in order to assure that the high picture quality this architecture provides is maintained.

SUMMARY OF THE INVENTION

Accordingly, the present invention is directed to a transcoder and methods of transcoding that substantially obviate one or more of the problems due to limitations and disadvantages of the related art.

Additional features and advantages of the invention will be set forth in part in the description which follows, and in part will be obvious from the description, or may be learned by practice of the invention. The objectives and other advantages of the invention will be realized and attained by the apparatus and methods particularly pointed out in the written description and claims hereof as well as the appended drawings. To achieve these and other advantages and in accordance with the purpose of the invention, as embodied and broadly described herein, the invention is directed to a method for transcoding coded digital video signals representing blocks of pixels, comprising the steps of: decoding inputted encoded digital signals, including the steps of determining an end-of-block (EOB) position in an incoming block of the encoded inputted signal, inverse quantizing the inputted signals, determining a discrete cosine transform (DCT) block type based on the EOB position, and performing partial inverse DCT computations based on the DCT block type to provide decoded signals; and encoding the decoded signals, including the steps of determining if an incoming block of the decoded signals is intracoded or intercoded, performing a DCT of the decoded signals by selecting, if the incoming block is intracoded, DCT coefficients from the inverse quantized inputted signals to provide transformed signals, and performing a DCT of the decoded signal by computing, if the incoming block is intercoded, selected DCT coefficients located before the EOB position of the incoming block to provide transformed signals.

Also in accordance with the present invention there is provided a method for transcoding coded digital video signals representing blocks of pixels, comprising the steps of: decoding inputted encoded digital signals, including steps of determining an end-of-block (EOB) position in an incoming block of the encoded inputted signal, inverse quantizing the inputted signals, determining a discrete cosine transform (DCT) block type based on the EOB position, and performing partial inverse DCT computations based on the DCT block type to provide decoded signals; and encoding the decoded signals.

Further in accordance with the present invention there is provided a method for transcoding coded digital video signals representing blocks of pixels, comprising the steps of: decoding inputted encoded digital signals, including steps of determining an end-of-block (EOB) position in an incoming block of the encoded inputted signal prior to inverse quantizing, inverse quantizing the inputted signals, and encoding the decoded signals, including steps of determining if an incoming block of the decoded signals is intracoded or intercoded, performing a discrete cosine transform (DCT) of the decoded signals by selecting, if the incoming block is intracoded, DCT coefficients from the inverse quantized inputted signals to provide transformed signals, and performing a DCT of the decoded signal by computing, if the incoming block is intercoded, selected DCT coefficients located before the EOB position of the incoming block to provide transformed signals.

Additionally in accordance with the present invention there is provided a transcoder for transcoding coded digital video signals representing blocks of pixels, comprising: a decoder for decoding inputted coded digital signals, including means for determining an end-of-block (EOB) position in an incoming block of the encoded inputted signal, an inverse quantizer for inverse quantizing the inputted signals, means for determining a discrete cosine transform (DCT) block type based on the EOB position, and an inverse discrete cosine transformer for performing partial inverse DCT computations based on the determined DCT block type to provide decoded signals; and an encoder to encode the decoded signals.

Yet further in accordance with the present invention there is provided a transcoder for transcoding digital video signals representing blocks of pixels, comprising: a decoder for decoding inputted encoded digital signals, including means for determining an end-of-block (EOB) position in an incoming block of the encoded inputted signals; and an inverse quantizer for inverse quantizing the inputted signal, and an encoder to encode the decoded signals, the encoder including means for determining if an incoming block of the decoded signals is intracoded or intercoded, and a discrete cosine transformer for performing a discrete cosine transform (DCT) of the decoded signals by selecting, if the incoming block is intracoded, DCT coefficients determined from the inverse quantized inputted signals, the discrete cosine transformer performing the DCT by computing, if the incoming block is intercoded, selected DCT coefficients located before the EOB position of the incoming block.

It is to be understood that both the foregoing general description and the following detailed description are exemplary and explanatory only and are not restrictive of the invention, as claimed.

The accompanying drawings, which are incorporated in and constitute a part of this specification, illustrate an embodiment of the invention and together with the description serve to explain principles of the invention.

DETAILED DESCRIPTION OF THE PREFERRED EMBODIMENTS

Embodiments consistent with the present invention are directed to apparatus and methods for implementing a cascaded pixel domain transcoder that operates faster than conventional cascaded pixel domain transcoders while maintaining comparable video quality.

Figure 4:
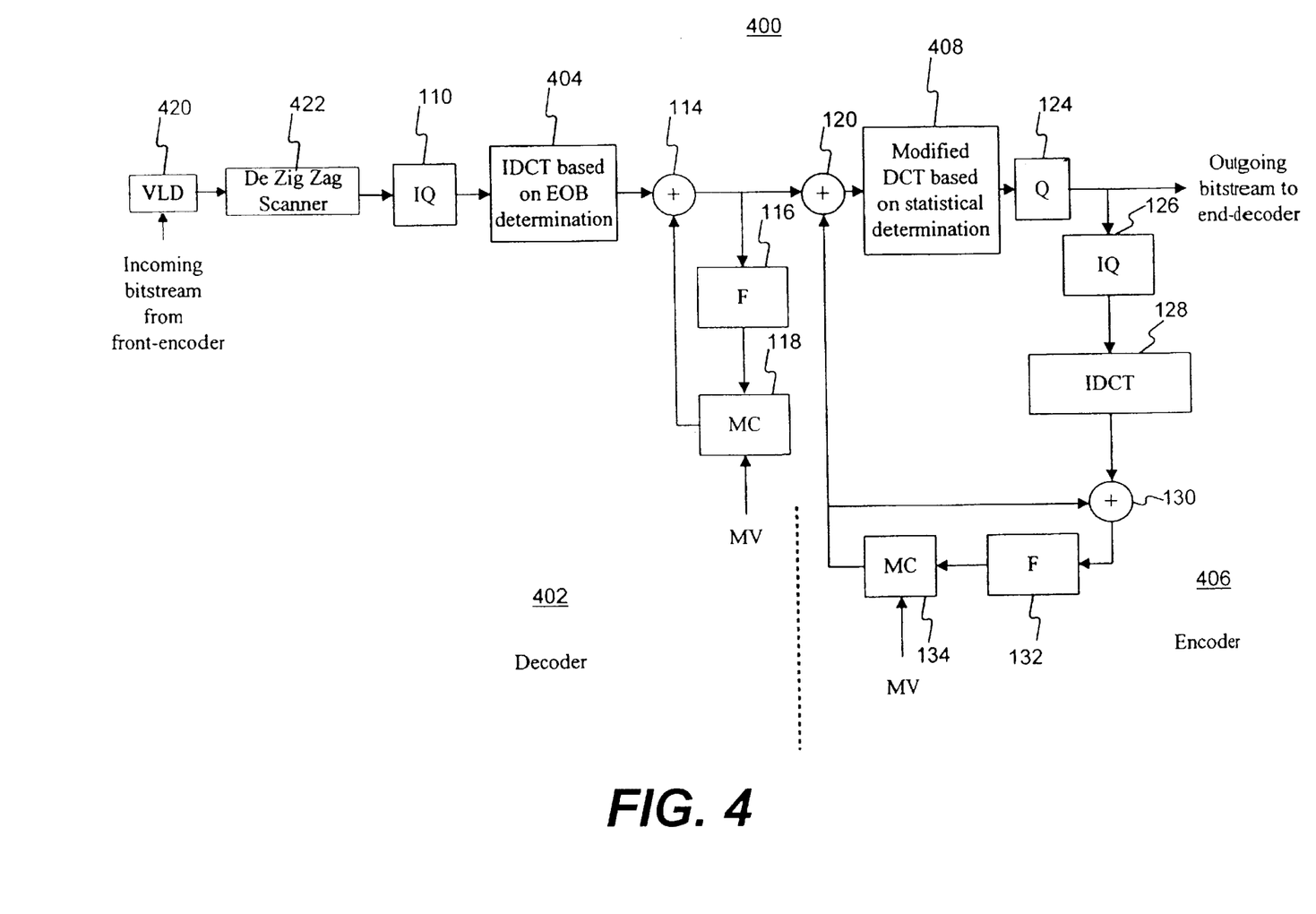
FIG. 4 illustrates a cascaded pixel domain transcoder constructed in accordance with an embodiment of the invention.

FIG. 4 illustrates a cascaded pixel domain transcoder 400 consistent with the present invention.

In transcoder 400, blocks performing the same functions as those of transcoder 100 in FIG. 1 are labeled with like reference numerals. A decoder 402 of transcoder 400 includes a block 404 for performing an IDCT based on an end-of-block (EOB) position in the incoming encoded video signal received from the front-encoder.

The computational complexity of the IDCT operation of decoder 402 is reduced by considering that typically a considerable percentage of the DCT blocks have only a few non-zero coefficients after quantization in the front-encoder. This is especially the case in low bit-rate applications. Further, the non-zero coefficients are concentrated at low spatial frequencies. Thus, useful information available to reduce the computation performed in block 404 for the IDCT is the EOB position from the incoming encoded video signal. The EOB represents the position of the last non-zero coefficient of the block in the zig-zag scan order. A zig-zag scan is performed in a video encoder, after quantization, in order to arrange DCT coefficients into a one-dimensional sequence in approximately ascending spatial frequency order. The EOB is available after variable-length decoding (VLD) by VLD 420 without additional computational cost. A de-zig-zag scanner 422 may then be used between VLD 420 and IQ 110 to reorder the DCT coefficients.

Figure 5:
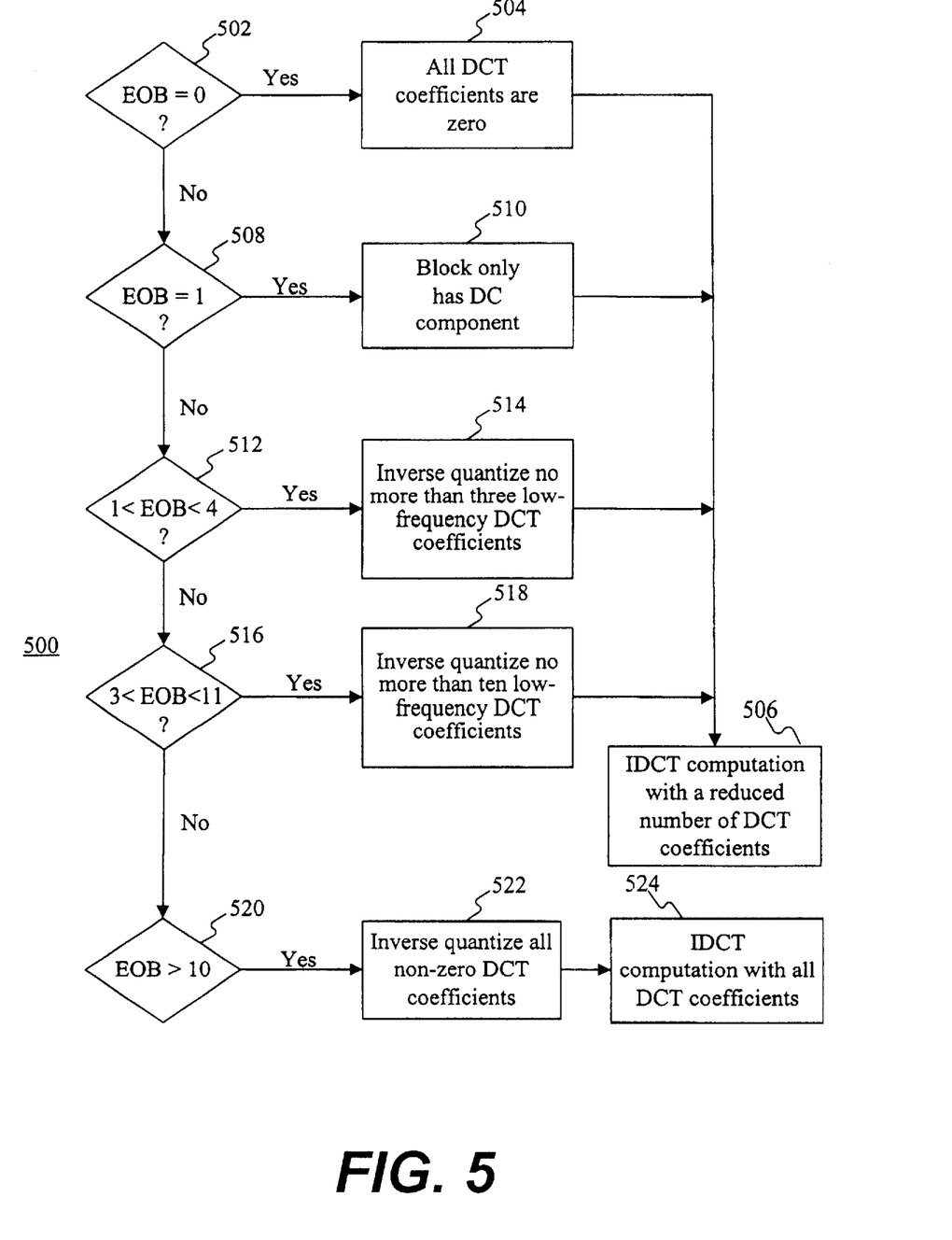
FIG. 5 illustrates a flowchart of a process for determining a DCT block type.

Based on the EOB position information, a DCT block may be categorized into one of five types. FIG. 5 illustrates a flow chart 500 of a process for determining the DCT block type based on the EOB position. This determination may be accomplished by the IDCT based on EOB block 404. That is, the IDCT based on EOB block 404 determines the number of DCT coefficients first, and then performs IDCT. As further described below, the modified DCT based on statistical determination block 408 may perform DCT based on this classification.

In step 502, if EOB=0, then the process determines that all DCT coefficients are zero. Thus, no inverse quantizations of DCT coefficients need to be performed (step 504). Processing then proceeds to the IDCT computation (step 506). In step 502, if EOB≠0, the process determines whether EOB=1 (step 508). If EOB=1, the process determines that the block only has a DC component (step 510). Thus, only the DC component needs to be inverse quantized. The IDCT computation (step 506) is also simplified because there is only one non-zero DCT coefficient. For illustrative purposes, the following demonstrates how the IDCT computation may be simplified if it is known that there is only one non-zero DCT coefficient. First, note that is the DCT and IDCT computations are as follows:

$$[DCT:]\ F(u,v) = C(u)C(v) \sum_{m=o}^{7}\sum_{n=o}^{7} f(m,n)\cos\left[\frac{(2m+1)u\pi}{16}\right]\cos\left[\frac{(2n+1)v\pi}{16}\right]\ u,v=0,1,L,7$$

$$[IDCT:]\ f(m,n) = \sum_{u=0}^{7}\sum_{v=0}^{7} C(u)C(v)F(u,v)\cos\left[\frac{(2m+1)u\pi}{16}\right]\cos\left[\frac{(2n+1)v\pi}{16}\right],\ n=0,1,L,7$$

where $C(u), C(v) = \begin{cases} \sqrt{\frac{1}{8}} & \text{for } u,v = 0 \\ \frac{1}{2} & \text{otherwise} \end{cases}$ Thus, if only the DC coefficient (i.e., GOB=1) exists in the incoming bit-stream, the IDCT computation can be simplified as:

$$f(m,n) = C(0)(0)F(0)(0)$$
$$= \frac{1}{8}F(0,0),\ m,n=0,1,L\ldots,7$$

Similarly, if it is known that a DCT block may have only the DC coefficient, the DCT computation may be simplified as follows:

$$F(0,0) = C(0)(0)\sum_{m=0}^{7}\sum_{n=0}^{7} f(m,n)\ u,v=0,1,L\ldots,7$$

In step 508, if EOB≠1, the process determines whether 1<EOB<4 (step 512). If 1<EOB<4, it is determined that all non-zero DCT coefficients are determined to be located in the ¹⁄₁₆ lower frequency block of DCT coefficients. Therefore, it is only necessary to inverse quantize no more than three low-frequency DCT coefficients (step 514). The IDCT computation (step 506) is also simplified because there are no more than three DCT coefficients.

If the EOB position does not satisfy the condition of step 512, it is determined whether 3<EOB<11 (step 516). If 3<EOB<11, the process determines that all non-zero DCT coefficients are located in the ¼ lower frequency block of DCT coefficients. Therefore, it is only necessary to inverse quantize no more than ten low frequency DCT coefficients (step 518). The IDCT computation (step 506) is also simplified because there are no more than ten DCT coefficients.

If the EOB position does not satisfy the condition of step 516, then EOB>10 (step 520) and all non-zero DCT coefficients need to be inverse quantized (step 522). Likewise, the IDCT computations of all the DCT coefficients need to be performed (step 524). As such, in this case, no computation reduction is achieved.

In summary, according to the process represented in flow chart 500, each DCT block in the encoded video signal is categorized into one of five block types based on the EOB position. Then, unless the EOB position is greater than 10, a reduced number of DCT coefficients are inverse quantized and the IDCT computation is performed with the reduced number of DCT coefficients. The IQ computation in block 110 is used to calculate the received DCT coefficients. Thus, the computational complexity of the IDCT is substantially reduced.

With reference again to FIG. 4, an encoder 406 of transcoder 400 includes a block 408 for performing a modified DCT based on a statistical determination that predicts which DCT coefficients may become zero after quantization.

Figure 6:
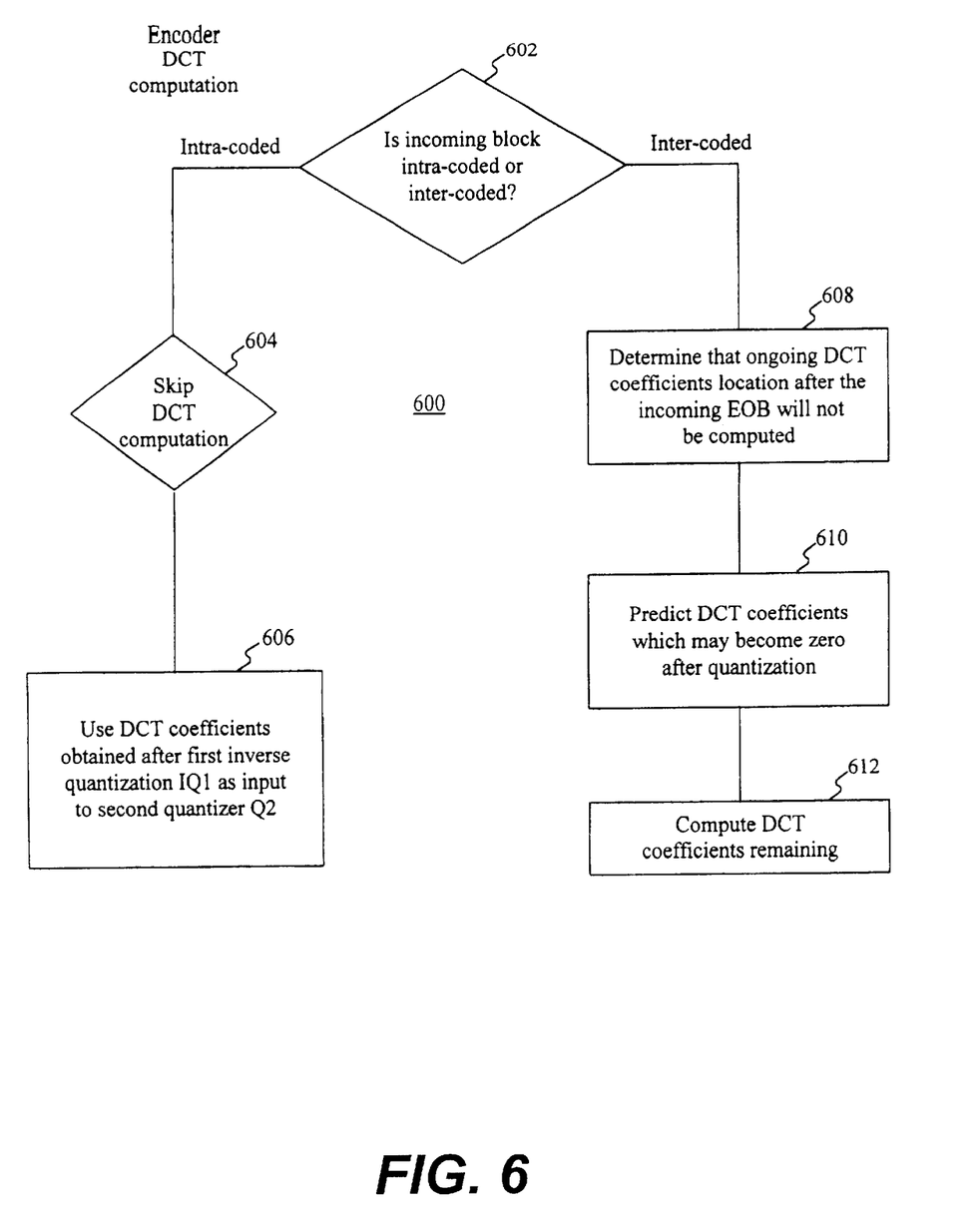
FIG. 6 illustrates a flowchart of a process for determining which DCT coefficients need to be calculated.

FIG. 6 illustrates a flowchart 600 of a process for determining whether and which DCT coefficients need to be calculated in performing the DCT in block 408. First, step 602 determines whether the incoming block in the decoded video signal received from decoder 402 is intracoded or intercoded. If the incoming block is intracoded, i.e., its coding only uses information from itself and no other blocks, the DCT computation in block 408 is skipped (step 604). Processing then proceeds to step 606 wherein the DCT coefficients obtained after the inverse quantization performed in block 110 of transcoder 400 are selected for use in the quantization performed in block 124.

Figure 7:
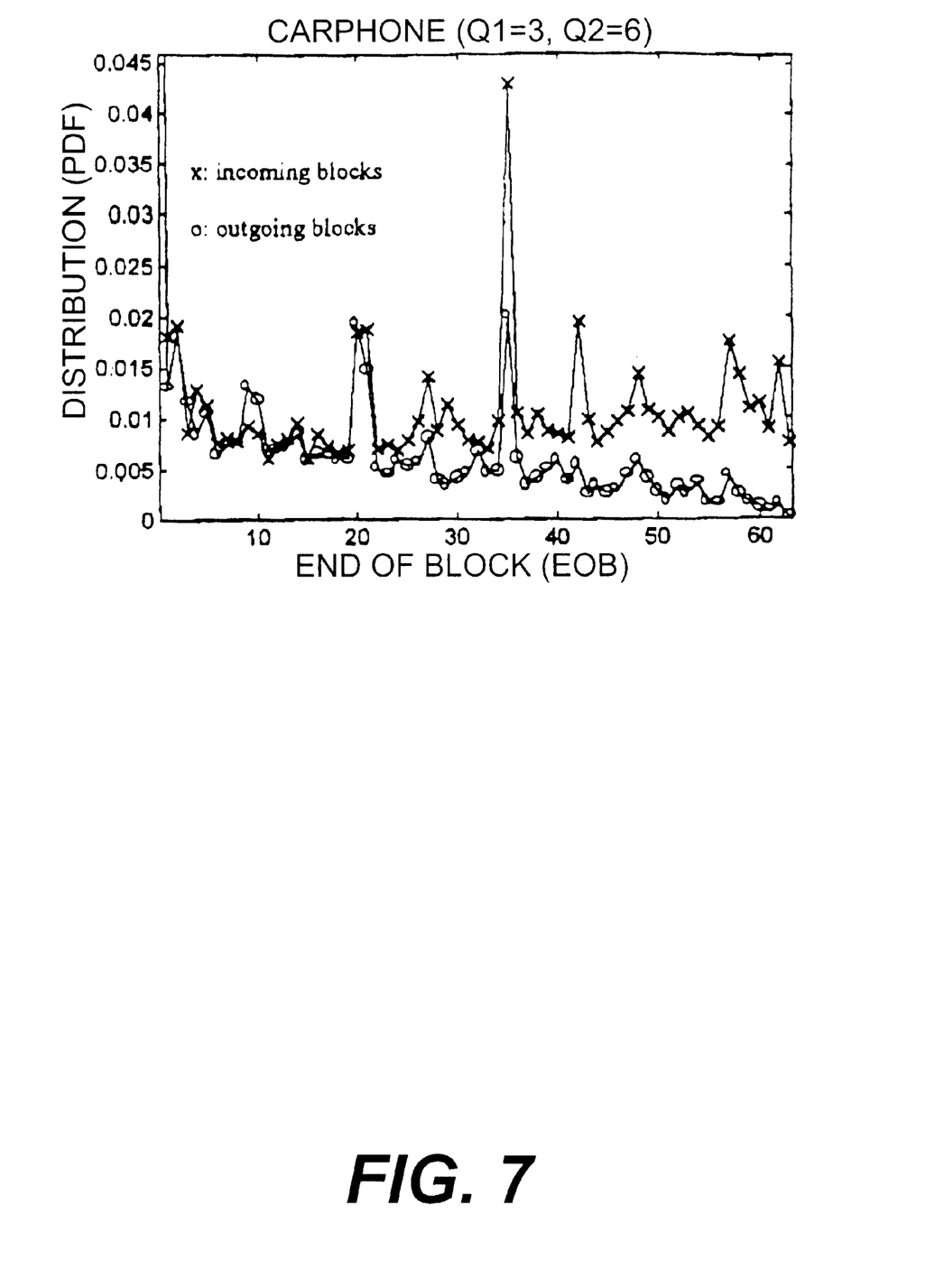
FIG. 7 illustrates an EOB distribution.

If at step 602 it is determined the incoming block is intercoded, processing proceeds to step 608 wherein it is determined that the computation of DCT coefficients located after the EOB of the incoming block can be skipped. The reason for this is based on results of simulations performed by the inventors that show that incoming EOBs are usually larger than outgoing EOBs, primarily due to the larger quantization step size utilized in the quantization performed in block 124. FIG. 7 illustrates an EOB distribution in the cascaded pixel-domain transcoder that was determined during simulations performed by the inventors. As illustrated, the incoming EOB are usually larger than the outgoing EOBs due to the larger quantization step-size in the outgoing quantizer (i.e., block 124). Based on this observation, the computation of the outgoing DCT coefficients located after the incoming EOB may be skipped.

Processing then proceeds to step 610 in which a prediction algorithm is performed to predict which DCT coefficients may become zero after the quantization performed in block 124. In step 612, only those DCT coefficients not predicted to become zero are computed.

Due to the larger quantization step-size in encoder 406, a further reduction in computational complexity may be achieved by performing a DCT prediction algorithm. The variances of the DCT coefficients are related to the SAD (Sum of Absolute Difference) of the motion compensated prediction errors. Thus, in encoder 406, by approximating the motion compensated prediction residuals with a Laplacian distribution, and given the SAD and the quantization parameter, the probability that a specific DCT coefficient will be quantized to zero can be determined. Then, to reduce computational complexity in the DCT performed in block 408, those DCT coefficients with high probabilities of being zero after quantization are skipped. However, in transcoder 400, the incoming motion vectors are re-used to avoid the computation of motion estimation and, as a result, the SAD is not available.

Although the SAD can be calculated using the motion vectors, such calculations undesirably increase computational complexity. Since in most rate-control schemes; e.g., the TMN8 rate-control scheme specified in ITU-T/SG16, "Video Codec Test model, TMN8," Portland, June 1997, the variance of the pixel values is computed for each 16×16 pixel macroblock. The computed variance of the macroblock is used herein to approximate the variance of a block in the macroblock. Therefore, for the transcoding of transcoder 400, the variance computation does not require any additional computations.

In determining the probability of whether a specific DCT coefficient will be quantized to zero, $\sigma_f$ is the standard deviation of the motion compensated pixel values of the incoming block. The standard deviation, $\sigma_f$, is, by definition, the square root of the signal variance. Also, $QP_2$ is defined as the quantization step size of the quantization performed in block 124. The step size, $QP_2$, is referred to as the second quantization parameter to distinguish from the step size used in the front-end encoder and referred to as the first quantization parameter. A series of thresholds $TH_1$, $TH_2$, $TH_3$, and $TH_4$ are applied in the prediction algorithm herein for predicting whether DCT coefficients will be zero after quantization. A systematic approach for determining the thresholds $TH_1$-$TH_4$ is described in M. -T. Sun and I. -M. Pao, "Modeling DCT coefficients for fast video encoding," IEEE Trans. on Circuits Syst. Video Technol., Vol. 9, no. 4, pp. 608–616, June 1999, which is hereby incorporated in its entirety by reference.

Figure 8:
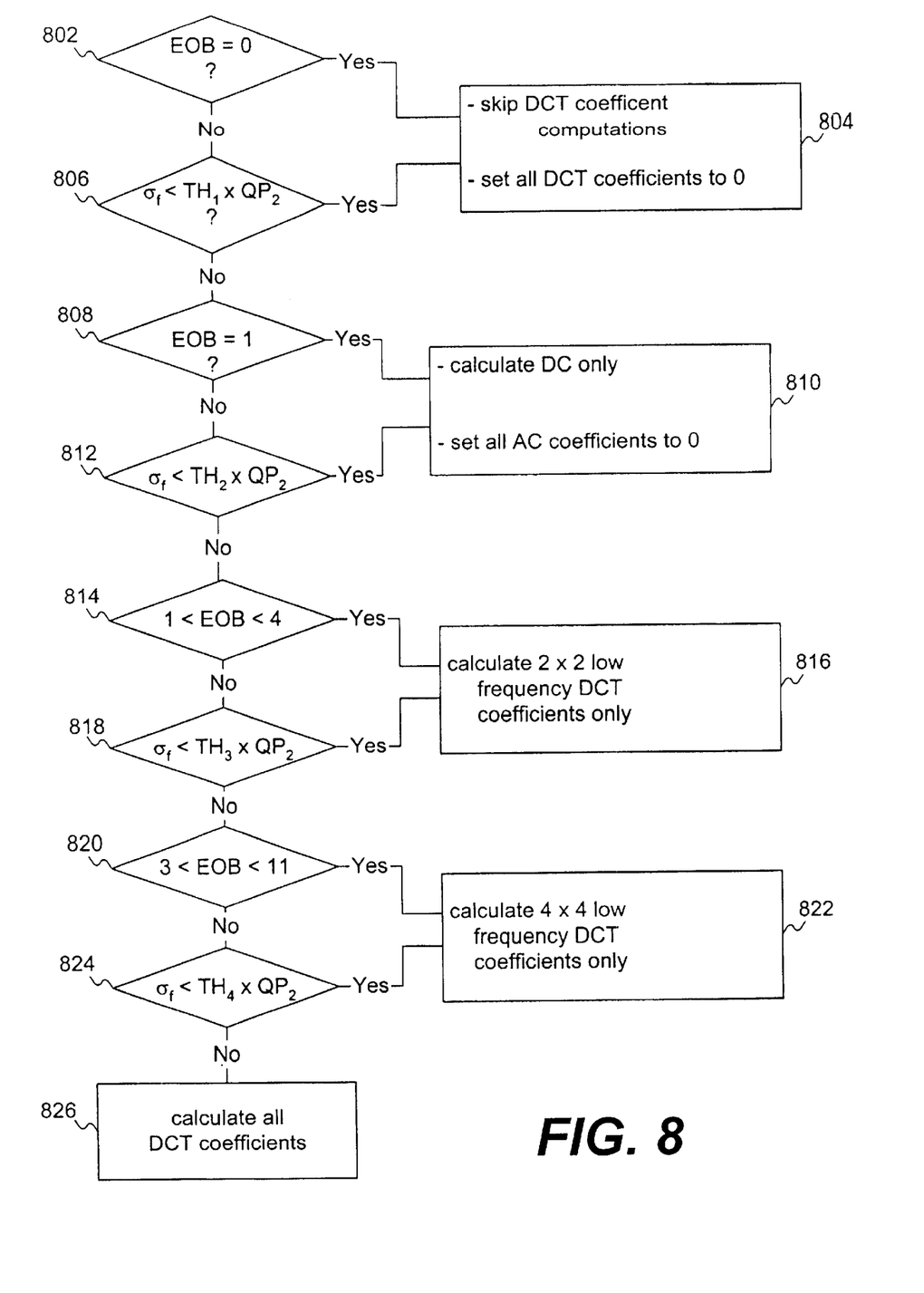
FIG. 8 illustrates a flowchart of a process for predicting which DCT coefficients will be zero after quantization.

FIG. 8 illustrates a flowchart 800 for an algorithm for predicting which DCT coefficients will be zero after quantization and which DCT coefficients should be calculated. First, the process determines if EOB=1 (step 802). If so, then the DCT computations may be skipped and all coefficients are set to 0 (step 804). Else, in step 806, the process determines if the following inequality is satisfied: $\sigma_f < TH_1 \times QP2$. If so, then processing proceeds to step 804 and the DCT computations may be skipped and all coefficients are set to 0.

Else, in step 808, the process determines if EOB=1. If so, the process determines that there is only a DC coefficient. Thus, the AC coefficients are set to 0 and only the DC coefficient is determined (step 810). Else, in step 812, the process determines if the following inequality is satisfied: $\sigma_f < TH_2 \times QP_2$. If so, the process proceeds to step 810 and the AC coefficients are set to 0 and only the DC coefficient is determined.

Else, in step 814, the process determines if 1<EOB<4. If so, only the 2×2 low frequency DCT coefficients are determined and the rest are set to 0 (step 816). Else, the process proceeds to step 818 where it determines if the following inequality is satisfied: $\sigma_f < TH_3 \times QP2$. If so, the process proceeds to step 816 and only the 2×2 low frequency DCT coefficients are determined and the rest are set to 0.

Else, in step 820, the process determines if 3<EOB<11. If so, only the 4×4 low it frequency DCT coefficients are determined and the rest are set to 0 (step 822). Else, in step 824, the process determines if the following inequality is satisfied: $\sigma_f < TH_4 \times QP_2$. If so, the process proceeds to step 822 and only the 4×4 low frequency DCT coefficients are calculated and the rest are set to 0.

Then, if none of the above are satisfied, the process determines all of the DCT coefficients (64 in this embodiment) (step 826).

Referring back to FIG. 7, this method takes advantage of the property, as shown, that the incoming EOBs are usually larger than the outgoing EOBs due to the larger quantization step-size in the outgoing quantizer (i.e., block 124). Based on this observation, the computation of the outgoing DCT coefficients located after the incoming EOB may be skipped. Therefore, each EOB determined in the decoder is carried through to the encoder and integrated with the statistical prediction algorithm of the encoder.

The transcoder 400 can be implemented either in software, or in hardwired circuitry, or in a programmable digital signal processor. If the transcoder is implemented in software, the specification of the processor depends on the computational demand of the particular application (e.g., videophone or entertainment video, real-time or non-real-time). In fact, aside from computing power, there are no specific requirements for the processor. Most current Intel Pentium processors can adequately run the software. Additionally, two-frame memory (e.g., approximately 2 Mbytes) can be used for video frame storage.

Figure 3:
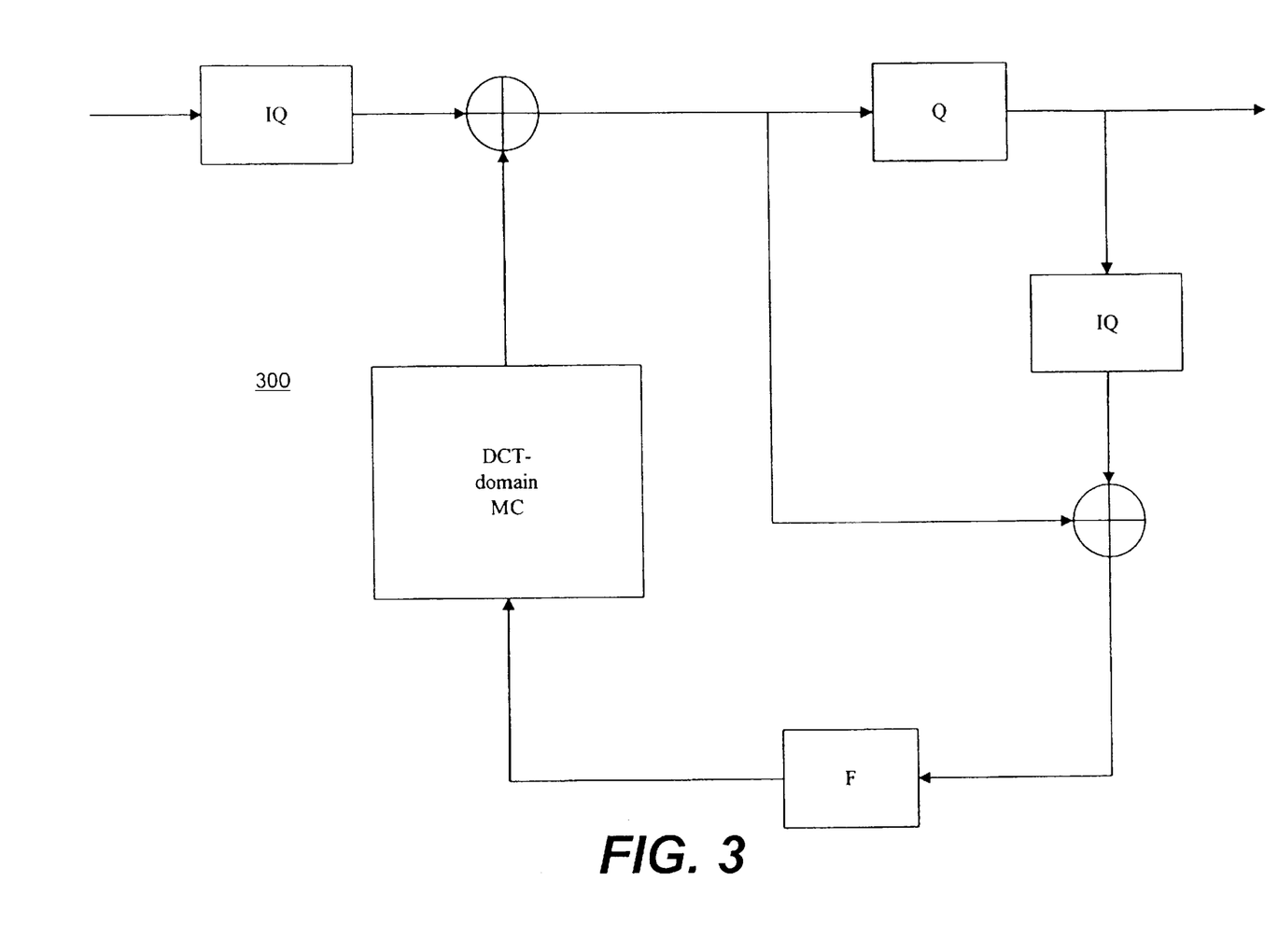
FIG. 3 illustrates a DCT domain transcoder.

Simulated performance of transcoder 400 was compared with conventional DCT-domain transcoder 300 shown in FIG. 3 in terms of computation complexity and video quality for H.263 and MPEG-2 transcoding. With respect to H.263 transcoding, the performances of transcoder 400 and the DCT-domain transcoder were applied for low-bit-rate applications. In terms of computational complexity, the DCT-domain transcoder does not perform any computations for a macroblock with a zero motion vector. The amount of computation is also reduced if the horizontal or vertical component of the motion vector is zero. However, when the motion vector refers to a block that is not aligned with the block boundary, the DCT-domain motion compensation requires a substantial amount of computations.

In the operation of transcoder 400, there are many zero blocks which do not require any processing. Also, after quantization, there often are few non-zero DCT coefficients, especially for low bit-rate applications. Therefore, the comparison of the overall complexity is preferably based on the actual distributions of the DCT coefficients, non-zero blocks, and motion vectors, and preferably is sequence-dependent.

In the performance simulations, the DCT-domain transcoder was implemented using the fast algorithm described in the above-cited Assunçao et al. reference wherein the DCT-domain motion compensation is approximated by multiplication-free integer operations.

The performance simulations were performed on a personal computer equipped with an Intel Pentium II 400 MHz CPU and 128-Mbyte memory. Three videophone sequences (the 'A', 'B', and 'C' sequences) and two TV sequences (the 'D' and 'E' sequences) were pre-encoded into different bit-rates and frame-rates and used for performance evaluation of transcoder 400.

In the simulations, the first frame in the bitstream was encoded as an I-picture and the remaining frames were encoded as P-pictures. Consistent with terminology used in this field of art, an I-picture is an intracoded picture, a P-picture is a predictive coded picture, and a B-picture is a bidirectionally-predictive coded picture. Table 1 summarizes the distribution of motion vectors for the three different video phone sequences designated A, B, and C when the original video sequences were encoded at 128 kb/s. Table 2 summarizes the distribution of predicted block types for the three video sequences when they were transcoded to 64 kb/s.

TABLE 1

Distribution of Motion Vectors (when encoded at 128 kb/s)

| Test Sequence | Both Dimensions | Horiz. or Vertic. Dimensions |
|---|---|---|
| A | 19% | 33% |
| B | 17% | 30% |
| C | 11% | 23% |

TABLE 2

Distribution of Predicted Block Types (from 128 kb/s to 64 kb/s)

| Test Seq. | ZERO BLOCK | DC BLOCK | 2 × 2 BLOCK | 4 × 4 BLOCK | 8 × 8 BLOCK |
|---|---|---|---|---|---|
| A | 41.1% | 5.1% | 4.4% | 17.3% | 32.1% |
| B | 50.2% | 7.4% | 7.1% | 9.7% | 25.6% |
| C | 59.8% | 4.3% | 6.4% | 13.4% | 16.1% |

Table 3 lists the measured frame rates for the three video sequences.

TABLE 3

H.263 Transcoding, Measured frame rate (128 kb/s to 64 or 32 kb/s, executed on an Intel Pentium II 400 (MHZ)

| | Transcoder 300 | | Transcoder 400 | |
|---|---|---|---|---|
| Test Sequence | 64 kb/s | 32 kb/s | 64 kb/s | 32 kb/s |
| C | 33.4 | 33.1 | 31.5 | 36.2 |
| B | 20.3 | 20.4 | 22.2 | 24.8 |
| A | 17.6 | 17.3 | 19.5 | 21.9 |

As seen in Table 3, the frame rate of transcoder 400 was generally faster than the fast DCT-domain transcoder 300. As the transcoding ratio is increased (e.g., the sequences are transcoded to 32 kb/s instead of 64 kb/s), the computation complexity in transcoder 400 is reduced since more DCT coefficients will be quantized to zeros, while that in DCT-domain transcoder 300 remains about the same. Further, transcoder 400 achieves comparable or faster speed to that of DCT-domain transcoder 300 without the limitations and the drift problem of the DCT-domain transcoder.

Tables 4 and 5 compare simulation results for the performance of transcoder 400 to that of a full-scale cascaded pixel-domain transcoder having the architecture of transcoder 100 illustrated in FIG. 1, with respect to image quality.

TABLE 4

Performance (128 kb/s and 64 kb/s)

| Test Sequence | Full-scale cascaded pixel-domain | | | Transcoder 400 | | |
|---|---|---|---|---|---|---|
| | Y | $C_b$ | $C_r$ | Y | $C_b$ | $C_r$ |
| A (10 frame/s) | 32.03 | 38.40 | 37.36 | 32.01 | 38.32 | 37.21 |
| B (10 frame/s) | 35.13 | 39.97 | 40.18 | 35.05 | 39.70 | 39.84 |
| C (30 frame/s) | 34.03 | 40.58 | 41.02 | 33.96 | 40.45 | 40.89 |

TABLE 5

Performance (128 kb/s and 32 kb/s)

| Test Sequence | Full-scale cascaded pixel-domain | | | Transcoder 400 | | |
|---|---|---|---|---|---|---|
| | Y | $C_b$ | $C_r$ | Y | $C_b$ | $C_r$ |
| A (10 frame/s) | 29.71 | 36.77 | 36.06 | 29.69 | 36.74 | 35.99 |
| B (10 frame/s) | 32.62 | 38.11 | 38.64 | 32.54 | 37.88 | 38.52 |
| C (30 frame/s) | 31.50 | 38.27 | 39.04 | 31.41 | 37.12 | 38.93 |

(Average PSNR (dB))

In the Y-$C_b$-$C_r$ color space, Y represents the luminance, and $C_b$ and $C_r$ represents the chrominance (color differences) components. The relationship between the Y-Cb-Cr space and the R-G-B (Red-Green-Blue) space is as follows:

$$\begin{bmatrix} Y \\ Cb \\ Cr \end{bmatrix} = \begin{bmatrix} 0.299 & 0.587 & 0.114 \\ -0.169 & -0.331 & 0.500 \\ 0.500 & -0.419 & -0.081 \end{bmatrix} \cdot \begin{bmatrix} R \\ G \\ B \end{bmatrix} + \begin{bmatrix} 0 \\ 128 \\ 128 \end{bmatrix}$$

As seen in Tables 4 and 5, the performance of transcoder 400 was substantially the same as that of transcoder 100. Accordingly, although transcoder 400 operates faster than the full scale transcoder, it provides a very similar picture quality. Further, transcoder 400 will typically operate at a faster speed and a superior picture quality than transcoder 300 (fast DCT-domain transcoder).

Based on the simulation results obtained in the H.263 transcoding, MPEG-2 transcoding by transcoder 400 should not have significant quality degradation caused by drift since a GOP (Group of Pictures) structure is used. For example, with a GOP containing 12 frames, an I-picture will terminate any drift-error in every 12 frames. Based on simulation results with H.263 transcoding, the drift in the fast DCT-domain transcoder is not significant in frames having indices (i.e., the sequence number of the frames after the I-frame) of order ten. Therefore, the DCT-domain transcoder can be used for MPEG-2 transcoding with minimal quality degradation. The computational complexity of transcoder 400 and the DCT-domain transcoder for MPEG-2 transcoding are compared next.

Compared to transcoder 400, the DCT-domain processing has several additional computational complexities in MPEG-2 transcoding relating to bi-directionally predicted pictures (B-pictures), conversion of incoming blocks from field-DCT to frame DCT, and the potential need to obtain a field from a frame in the DCT-domain.

The GOP structure usually includes B-pictures. Since the major processing in the DCT-domain transcoder is the DCT-domain motion compensation, and B-pictures require bi-directional DCT-domain motion compensation operations, the computational complexity is approximately doubled for B-pictures. Thus, the number of B-pictures strongly impacts the computational speed. In contrast, for transcoder 400, the impact is not as significant since bi-directional motion compensation in the pixel-domain is a relatively simple process.

MPEG-2 bit streams may contain DCT coefficients that are computed from only the odd- or even-field in the front-encoder. Since only frame DCT coefficients can be obtained using the DCT-domain motion compensation, additional conversion of incoming blocks from field-DCT to frame-DCT are necessary, so that the motion-compensated block can be directly subtracted from the incoming block. Such DCT-domain field/frame DCT conversion is discussed in greater detail in the above-cited Assunçao et al. reference and requires additional computational complexity.

Further, MPEG-2 bit-streams may contain field motion vectors that refer to an odd- or even-field instead of a frame. In this case, the DCT-domain motion compensation should include a function to obtain the field from the frame in the DCT-domain. Such a process can be performed in the DCT domain as described in the above-cited Assunçao et al. reference. However, it also increases computational complexity.

Tables 6, 7, and 8 summarize the distributions of motion vectors and block types for performance simulations of two sample MPEG-2 bit-streams, designated "D" and "E", encoded at 4 Mpbs. The encoded bit-streams D and E have a GOP of (12,3), where the numbers 12 and 3 represent the GOP length and the distance between the adjacent I/P frames, respectively. For reference, a generic GOP structure of (N,M) is as follows:

TABLE 6

Distribution of motion vectors in P-pictures
(MPEG-2 bitstream at 4 Mb/s, GOP of (12,3))

| Test sequences | Zero MVs | Only Vertical | Only Horizontal | Both Directions |
|---|---|---|---|---|
| D (720 × 576) | 15.2% | 1.5% | 54.7% | 28.7% |
| E (704 × 480) | 36.8% | 12.4% | 15.2% | 35.6% |

TABLE 7

Distribution of motion vectors in B-pictures
(MPEG-2 bitstream at 4 Mb/s, GOP of (12,3))

| Test sequences | Zero MVs | Only Vertical | Only Horizontal | Both Directions |
|---|---|---|---|---|
| D (720 × 576) | 1% | 1.2% | 73.2% | 24.6% |
| E (704 × 480) | 23.4% | 22.7% | 21.5% | 32.5% |

TABLE 8

Distribution of DCT block type in I, P and B-pictures
(MPEG-2 bitstream at 4 Mb/s, GOP of (12,3))

| Test sequences | ZERO BLOCK | DC BLOCK | 2 × 2 BLOCK | 4 × 4 BLOCK | 8 × 8 BLOCK |
|---|---|---|---|---|---|
| D (720 × 576) | 64.2% | 2.7% | 2% | 6.7% | 24.5% |
| E (704 × 480) | 56.7% | 5.6% | 5.8% | 12.2% | 19.7% |

As shown in Tables 6, 7, and 8, the distributions of non-zero motion vectors having both vertical and horizontal director components in the 'D' sequence was 28.7%. Using the transcoder 400, the percentages of blocks which require a full 8×8 DCT computation was 24.5% for the 'D' sequence. For the 'E' sequence, the percentage of blocks which require full 8×8 DCT computation in transcoder 400 was 19.7%, which is much smaller than the percentage of motion vectors having both direction components in the DCT-domain transcoder. By taking into consideration B-pictures which have about 30% of motion vectors with both directions, the computational complexity of the DCT-domain transcoder becomes much higher because two DCT-domain motion compensations are required in this case. These distributions give insights into the relative speeds of transcoder 400 and the DCT-domain transcoder for MPEG-2 transcoding as shown in Table 9.

TABLE 9

| | MPEG-2 Transcoding, Measured frame rate (20 or 8 Mb/s to 4 Mb/s with GOP of (12,3)) executed on an Intel Pentium II 400 MHz | | | |
|---|---|---|---|---|
| | Fast DCT-domain transcoder | | Proposed fast transcoder | |
| Test Sequence | 20 M to 4 M | 8 M to 4 M | 20 M to 4 M | 8 M to 4 M |
| D (720 × 576) | 0.80 | 0.88 | 1.16 | 1.45 |
| E (704 × 480) | 1.03 | 1.16 | 1.25 | 1.49 |

Compared with the case in H.263 transcoding, transcoder 400 performs much faster than the fast DCT-domain transcoder in MPEG-2 transcoding. One reason for this superior performance is that there are B-pictures and fewer zero motion vectors in the MPEG-2 sequences than in H.263. This will generally be the case in most video streams targeting MPEG-2 applications.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for transcoding coded digital video signals representing blocks of pixels, comprising the steps of:
   decoding inputted encoded digital signals, including the steps of
      determining an end-of-block (EOB) position in an incoming block of the encoded inputted signal,
      inverse quantizing the inputted signals,
      determining a discrete cosine transform (DCT) block type based on the EOB position, and
      performing partial inverse DCT computations based on the DCT block type to provide decoded signals; and
   encoding the decoded signals, including the steps of
      determining if an incoming block of the decoded signals is intracoded or intercoded,
      performing a DCT of the decoded signals by selecting, if the incoming block is intracoded, DCT coefficients from the inverse quantized inputted signals to provide transformed signals, and
      performing a DCT of the decoded signal by computing, if the incoming block is intercoded, selected DCT coefficients located before the EOB position of the incoming block to provide transformed signals.

2. The method of claim 1 wherein the step of computing selected DCT coefficients includes steps of:
   predicting which DCT coefficients may become zero after a subsequent quantization step; and
   only computing DCT coefficients that may not become zero after the subsequent quantization step.

3. The method of claim 1 further including a step of motion compensating the decoded signals.

4. The method of claim 1 further including steps of:
   quantizing the transformed signals to provide encoded signals; and
   performing motion compensation on the encoded signals.

5. The method of claim 1 wherein the step of determining a DCT block type includes steps of:
   determining a first DCT block type if the EOB position=0, for which all DCT coefficients are zero;
   determining a second DCT block type if the EOB position=1, for which the incoming block of the encoded signal has only a DC component;
   determining a third DCT block type if 1<the EOB position<4, for which at most three low frequency DCT coefficients need be computed;
   determining a fourth DCT block type if 3<the EOB position<11, for which at most ten low frequency DCT coefficients need be computed; and
   determining a fifth DCT block type if the EOB position>10, for which all non-zero DCT coefficients need be computed.

6. The method of claim 1 wherein the step of performing a DCT, if the incoming block is intercoded, includes a substep of only computing the selected DCT coefficients located before the EOB position.

7. A method for transcoding coded digital video signals representing blocks of pixels, comprising the steps of:
   decoding inputted encoded digital signals, including steps of
      determining an end-of-block (EOB) position in an incoming block of the encoded inputted signal,
      inverse quantizing the inputted signals,
      determining a discrete cosine transform (DCT) block type based on the EOB position, and
      performing partial inverse DCT computations based on the DCT block type to provide decoded signals; and
   encoding the decoded signals.

8. The method of claim 7 wherein the step of determining a DCT block type includes steps of:
   determining a first DCT block type if the EOB position=0, for which all DCT coefficients are zero;
   determining a second DCT block type if the EOB position=1, for which the incoming block of the encoded signal has only a DC component;
   determining a third DCT block type if 1<the EOB position<4, for which at most three low frequency DCT coefficients need be computed;
   determining a fourth DCT block type if 3<the EOB position<11, for which at most ten low frequency DCT coefficients need be computed; and
   determining a fifth DCT block type if the EOB position>10, for which all non-zero DCT coefficients need be computed.

9. A method for transcoding coded digital video signals representing blocks of pixels, comprising the steps of:
   decoding inputted encoded digital signals, including steps of
      determining an end-of-block (EOB) position in an incoming block of the encoded inputted signal prior to inverse quantizing,
      inverse quantizing the inputted signals, and
   encoding the decoded signals, including steps of
      determining if an incoming block of the decoded signals is intracoded or intercoded,
      performing a discrete cosine transform (DCT) of the decoded signals by selecting, if the incoming block is intracoded, DCT coefficients from the inverse quantized inputted signals to provide transformed signals, and
      performing a DCT of the decoded signal by computing, if the incoming block is intercoded, selected DCT coefficients located before the EOB position of the incoming block to provide transformed signals.

10. The method of claim 9 wherein the step of computing selected DCT coefficients includes steps of:
    predicting which DCT coefficients may become zero after a subsequent quantization step; and only computing DCT coefficients that may not become zero after the subsequent quantization step.

11. A transcoder for transcoding coded digital video signals representing blocks of pixels, comprising:
   a decoder for decoding inputted coded digital signals, including
      means for determining an end-of-block (EOB) position in an incoming block of the encoded inputted signal,
      an inverse quantizer for inverse quantizing the inputted signals,
      means for determining a discrete cosine transform (DCT) block type based on the EOB position, and
      an inverse discrete cosine transformer for performing partial inverse DCT computations based on the determined DCT block type to provide decoded signals; and
   an encoder to encode the decoded signals.

12. The transcoder of claim 11, wherein the means for determining a DCT block type includes:
   means for determining a first DCT block type if the EOB position=0, for which all DCT coefficients are zero;
   means for determining a second DCT block type if the EOB position=1, for which the incoming block of the encoded signal has only a DC component;
   means for determining a third DCT block type if 1<the EOB position<4, for which at most three low frequency DCT coefficients need be computed;
   means for determining a fourth DCT block type if 3<the EOB position<11, for which at most ten low frequency DCT coefficients need be computed; and
   means for determining a fifth DCT block type if the EOB position>10, for which all non-zero DCT coefficients need be computed.

13. A transcoder for transcoding digital video signals representing blocks of pixels, comprising:
   a decoder for decoding inputted encoded digital signals, including
      means for determining an end-of-block (EOB) position in an incoming block of the encoded inputted signals; and
      an inverse quantizer for inverse quantizing the inputted signal, and
   an encoder to encode the decoded signals, the encoder including
      means for determining if an incoming block of the decoded signals is intracoded or intercoded, and
      a discrete cosine transformer for performing a discrete cosine transform (DCT) of the decoded signals by selecting, if the incoming block is intracoded, DCT coefficients determined from the inverse quantized inputted signals, the discrete cosine transformer performing the DCT by computing, if the incoming block is intercoded, selected DCT coefficients located before the EOB position of the incoming block.

14. The transcoder of claim 13, further including a quantizer for quantizing transformed signals provided by the discrete cosine transformer;
   the discrete cosine transformer further including
      means for predicting which DCT coefficients may become zero after quantization by the quantizer, and
      means for only computing DCT coefficients that may not become zero after the quantization.

* * * * *